US011128338B2

(12) United States Patent
Park et al.

(10) Patent No.: US 11,128,338 B2
(45) Date of Patent: Sep. 21, 2021

(54) SWITCHABLE ELECTROMAGNETIC RING

(71) Applicant: Qualcomm Incorporated, San Diego, CA (US)

(72) Inventors: Hyun Min Park, Belmont, CA (US); Kwan-Woo Kim, Palo Alto, CA (US)

(73) Assignee: QUALCOMM incorporated, San Diego, CA (US)

( * ) Notice: Subject to any disclaimer, the term of this patent is extended or adjusted under 35 U.S.C. 154(b) by 0 days.

(21) Appl. No.: 16/793,531

(22) Filed: Feb. 18, 2020

(65) Prior Publication Data

US 2021/0258036 A1 Aug. 19, 2021

(51) Int. Cl.
*H04B 5/00* (2006.01)
*H04B 1/44* (2006.01)
*H04W 88/02* (2009.01)
*H04B 10/40* (2013.01)

(52) U.S. Cl.
CPC ............... *H04B 1/44* (2013.01); *H04B 10/40* (2013.01); *H04W 88/02* (2013.01)

(58) Field of Classification Search
CPC ... H04B 1/44; H04B 1/40; H04B 1/04; H04B 2001/0408; H04B 2001/0416; H04B 1/48; H04B 1/581; H04W 88/02
See application file for complete search history.

(56) References Cited

U.S. PATENT DOCUMENTS

| | | | | |
|---|---|---|---|---|
| 9,312,060 | B2 * | 4/2016 | Godoy | H01F 27/006 |
| 9,477,004 | B2 * | 10/2016 | Bosnar | G01V 3/104 |
| 2006/0267717 | A1 * | 11/2006 | Posamentier | H01F 21/12 336/137 |
| 2017/0085288 | A1 * | 3/2017 | Mekechuk | H04B 3/54 |
| 2019/0097686 | A1 * | 3/2019 | Ichikawa | H04B 5/0031 |

\* cited by examiner

*Primary Examiner* — Tuan Pham

(57) ABSTRACT

An apparatus is disclosed that implements a switchable electromagnetic ring. In an example aspect, the apparatus includes a wireless transceiver with an electromagnetic circuit and at least one switchable electromagnetic ring. The electromagnetic circuit is configured to generate an electromagnetic field. The at least one switchable electromagnetic ring includes a switch and a conductive element. The switch has a first terminal and a second terminal. The conductive element is connected between the first terminal and the second terminal. At least a portion of the conductive element is positioned within the electromagnetic field.

17 Claims, 6 Drawing Sheets

SWITCHABLE ELECTROMAGNETIC RING

TECHNICAL FIELD

This disclosure relates generally to wireless transceivers and, more specifically, to a wireless transceiver with an electromagnetic circuit and an associated switchable electromagnetic ring.

BACKGROUND

As additional portions of the radio-frequency spectrum become available for wireless communication, 5th-Generation (5G)-capable devices or next-generation wireless local area network (WLAN)-capable devices can be designed to utilize a larger range of frequencies and wider bandwidths. The additional portions of the radio-frequency spectrum can enable these devices to increase transmission rates and throughput to provide new wireless capabilities and mobile services. It can be challenging, however, to design a transceiver that utilizes the larger range of frequencies and wider bandwidths without increasing the size and complexity of the transceiver, which increases the size and costs of such devices.

SUMMARY

An apparatus is disclosed that implements a switchable electromagnetic ring. The switchable electromagnetic ring includes a conductive element connected between a first terminal of a switch and a second terminal of the switch. At least a portion of the switchable electromagnetic ring is positioned within an electromagnetic field generated by an electromagnetic circuit. In some implementations, the conductive element and the switch form a shape that surrounds (e.g., encloses) at least an appreciable portion of the electromagnetic circuit. When the switch is in the open state, the switchable electromagnetic ring establishes an open circuit, and an inductance of the electromagnetic circuit is relatively unaffected by the switchable electromagnetic ring. When the switch is in the closed state, however, the switchable electromagnetic ring establishes a closed circuit, and the inductance of the electromagnetic circuit changes (e.g., decreases) due to the closed circuit of the switchable electromagnetic ring. An amount that the inductance changes is based on a distance between the switchable electromagnetic ring and the electromagnetic circuit. In some implementations, multiple switchable electromagnetic rings, which may be substantially concentric with each other, can be used to adjust the inductance of the electromagnetic circuit by additional amounts.

By using switchable electromagnetic rings, inductances of electromagnetic circuits within a transceiver can be dynamically adjusted for different frequency ranges. In this way, the transceiver can use a same transmission or reception path to support a larger range of frequencies and wider bandwidths. Furthermore, because the switch of the electromagnetic ring is not implemented within the direct signal propagation path, the switch can be implemented using a low-performance switch that is cheaper and smaller than a high-performance switch used in switchable inductors of a transceiver.

In an example aspect, an apparatus is disclosed. The apparatus includes a wireless transceiver with an electromagnetic circuit and at least one switchable electromagnetic ring. The electromagnetic circuit is configured to generate an electromagnetic field. The at least one switchable electromagnetic ring includes a switch and a conductive element. The switch has a first terminal and a second terminal. The conductive element is connected between the first terminal and the second terminal. At least a portion of the conductive element is positioned within the electromagnetic field.

In an example aspect, an apparatus is disclosed. The apparatus includes a wireless transceiver with electromagnetic means for generating an electromagnetic field. The wireless transceiver also includes establishment means for selectively establishing an open circuit or a closed circuit. At least a portion of the establishment means is positioned within the electromagnetic field.

In an example aspect, a method for adjusting an inductance of an electromagnetic circuit using a switchable electromagnetic ring is disclosed. The method includes generating an electromagnetic field using an electromagnetic circuit. The method also includes establishing an open circuit using a switchable electromagnetic ring. At least a portion of the switchable electromagnetic ring is positioned within the electromagnetic field. The method additionally includes providing, via the electromagnetic circuit, a first inductance based on the switchable electromagnetic ring establishing the open circuit. The method further includes establishing a closed circuit using the switchable electromagnetic ring. The method also includes providing, via the electromagnetic circuit, a second inductance based on the switchable electromagnetic ring establishing the closed circuit. The second inductance is different from the first inductance.

In an example aspect, an apparatus is disclosed. The apparatus includes a wireless transceiver with a signal propagation path and at least one switchable electromagnetic ring. The signal propagation path includes an electromagnetic circuit. The at least one switchable electromagnetic ring includes a switch and a conductive element. The switch has a first terminal and a second terminal. The conductive element is connected between the first terminal and the second terminal. The conductive element and the switch form a shape that at least substantially surrounds the electromagnetic circuit.

DETAILED DESCRIPTION

Figure 1:
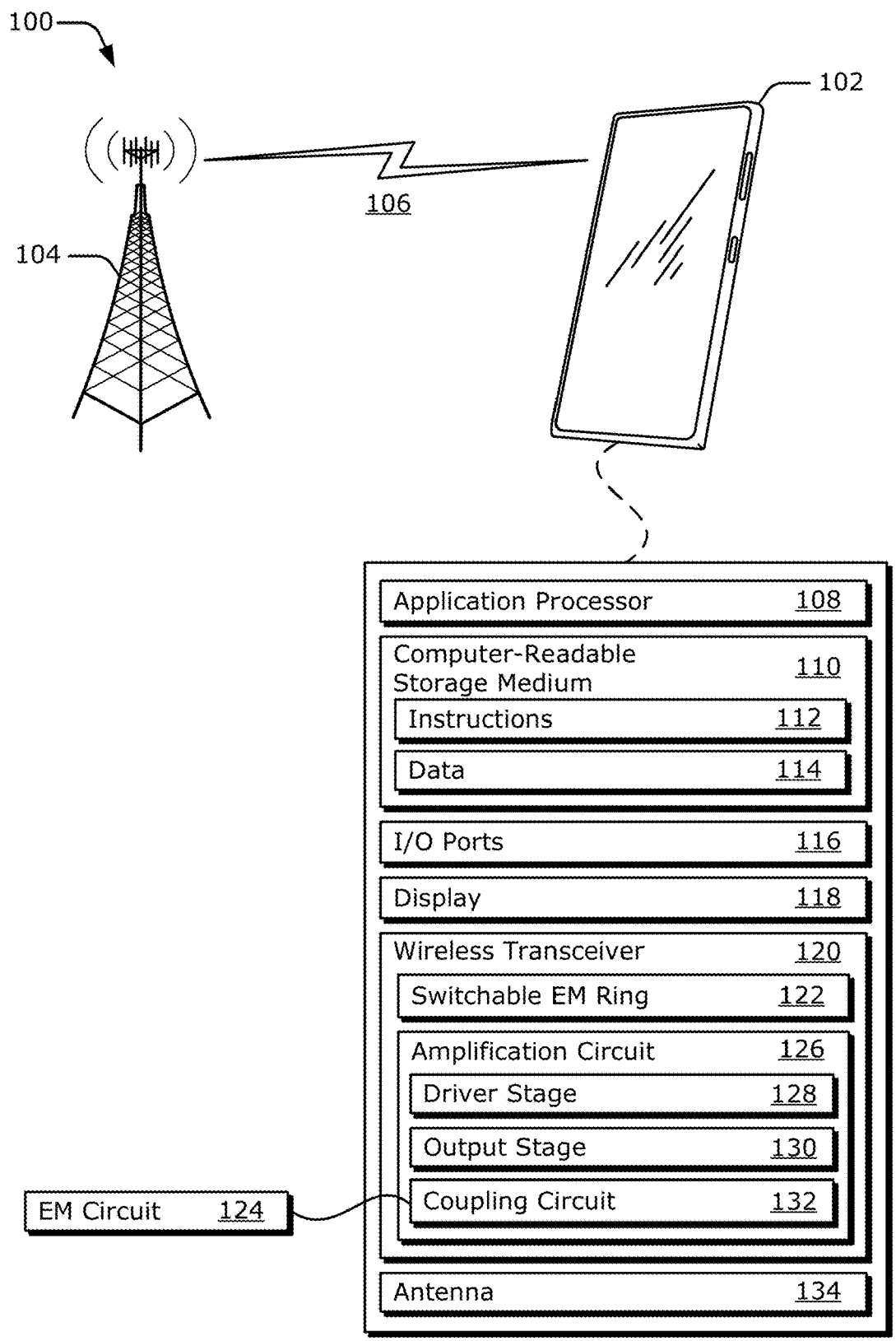
FIG. 1 illustrates an example operating environment for utilizing a switchable electromagnetic ring.

As additional portions of the radio-frequency spectrum become available for wireless communication, 5th-Generation (5G)-capable devices or next-generation wireless local area network (WLAN)-capable devices can be designed to utilize a larger range of frequencies and wider bandwidths. The additional portions of the radio-frequency spectrum can enable these devices to increase transmission rates and throughput to provide new wireless capabilities and mobile services. It can be challenging, however, to design a transceiver that utilizes the larger range of frequencies and wider bandwidths without increasing the size and complexity of the transceiver or an amplification circuit thereof.

Some techniques, for example, implement multiple parallel transmission or reception paths that are specific to a particular associated range of frequencies. Each parallel path can include, for instance, an amplification circuit that is designed to provide a peak gain within the particular associated range of frequencies. Implementing multiple parallel paths, however, can increase the cost and size of the transceiver. Furthermore, a total quantity of parallel paths can be limited by size constraints of the device. Consequently, this approach may be impractical for mobile devices that place a premium on small size and low weight.

Other techniques use a switchable inductor to adjust a resonant frequency of a portion of an amplification circuit. For example, a switchable inductor can provide different inductances for different frequency ranges. By adjusting its inductance, the switchable inductor can change a resonant frequency of the amplification circuit and thereby tailor a gain of the amplification circuit for the different frequency ranges. This technique, however, has several disadvantages. First, the quality factor of the switchable inductor decreases when its switch is in the closed state. This can decrease a gain of the amplification circuit as well as the output power at saturation (Psat). Second, because its switch is within the signal propagation path, the reliability of the switch can degrade over time. Although a high-performance switch can be used to improve reliability, the high-performance switch can be costly and large in size relative to other types of switches that provide less reliability.

To address these issues, an apparatus is disclosed that implements a switchable electromagnetic ring. The switchable electromagnetic ring includes a conductive element connected between a first terminal of a switch and a second terminal of the switch. At least a portion of the switchable electromagnetic ring is positioned within an electromagnetic field generated by an electromagnetic circuit. In some implementations, the conductive element and the switch form a shape that surrounds (e.g., encloses) at least an appreciable portion of the electromagnetic circuit. When the switch is in the open state, the switchable electromagnetic ring establishes an open circuit, and an inductance of the electromagnetic circuit is relatively unaffected by the switchable electromagnetic ring. When the switch is in the closed state, however, the switchable electromagnetic ring establishes a closed circuit, and the inductance of the electromagnetic circuit changes (e.g., decreases) due to the closed circuit of the switchable electromagnetic ring. An amount that the inductance changes is based on a distance between the switchable electromagnetic ring and the electromagnetic circuit. In some implementations, multiple switchable electromagnetic rings, which can be substantially concentric with each other, can be used to adjust the inductance of the electromagnetic circuit by additional amounts.

By using switchable electromagnetic rings, inductances of electromagnetic circuits within a transceiver can be dynamically adjusted for different frequency ranges. In this way, the transceiver can use a same transmission or reception path to support a larger range of frequencies and wider bandwidths. Furthermore, because the switch of the electromagnetic ring is not implemented within the direct signal propagation path of the transceiver, the switch can be implemented using a low-performance switch that is cheaper and smaller than a high-performance switch used in switchable inductors of a transceiver.

FIG. 1 illustrates an example environment 100 for utilizing a switchable electromagnetic ring 122. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, broadband router, an access point, a cellular phone, a gaming device, a navigation device, a media device, a laptop computer, a desktop computer, a tablet computer, wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, a mesh network node, a fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular; IEEE 802.11 (e.g., Wi-Fi™); IEEE 802.15 (e.g., Bluetooth™); IEEE 802.16 (e.g., WiMAX™); and so forth. In some implementations, the wireless link 106 may wirelessly provide power, and the computing device 102 or the base station 104 may comprise a power source, with the other comprising a power receiver.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented.

A wireless transceiver 120 of the computing device 102 provides connectivity to respective networks and other electronic devices connected therewith. Alternatively or additionally, the computing device 102 can include a wired transceiver, such as an Ethernet or fiber optic interface for communicating over a local network, intranet, or the Internet. The wireless transceiver 120 can facilitate communication over any suitable type of wireless network, such as a wireless local area network (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via an antenna 134. Components of the wireless transceiver 120 can include amplifiers, switches, mixers, analog-to-digital converters, filters, and so forth for conditioning the communication signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antenna 134.

The wireless transceiver 120 also includes a switchable electromagnetic (EM) ring 122 and an electromagnetic circuit 124. The electromagnetic circuit 124 can include at least one inductor. In some cases, the electromagnetic circuit 124 implements at least a portion of a tuning circuit (e.g., an inductor-capacitor (LC) circuit), a coupling circuit (e.g., a transformer), an impedance-matching circuit, or combinations thereof. The electromagnetic circuit 124 can be included as part of an amplification circuit 126, a filter, a mixer, or a voltage-controlled oscillator. The electromagnetic circuit 124 generates an electromagnetic field, which can couple the electromagnetic circuit 124 to the switchable electromagnetic ring 122.

At least a portion of the switchable electromagnetic ring 122 is positioned within the electromagnetic field generated by the electromagnetic circuit 124. The switchable electromagnetic ring 122 selectively establishes an open circuit (e.g., an open loop) or a closed circuit (e.g., a closed loop). In some implementations, these circuits at least substantially surround the electromagnetic circuit 124 in a same plane or a different plane as the electromagnetic circuit 124.

When the open loop is established, the performance of the electromagnetic circuit 124 is relatively unaffected by the switchable electromagnetic ring 122. In other words, a performance of the electromagnetic circuit 124 apart from an electromagnetic ring is relatively similar to the performance thereof with the switchable electromagnetic ring 122 being present and establishing the open loop.

When the closed loop is established, however, the performance of the electromagnetic circuit 124 is adjusted by the switchable electromagnetic ring 122. For example, an impedance of the electromagnetic circuit 124 can change due to the coupling between the switchable electromagnetic ring 122 and the electromagnetic circuit 124. In particular, an inductance of the electromagnetic circuit 124 can decrease due to the electromagnetic coupling between the switchable electromagnetic ring 122 and the electromagnetic circuit 124. By selectively establishing the open circuit or the closed circuit, the switchable electromagnetic ring 122 can adjust an inductance of an electromagnetic circuit 124 to enable the wireless transceiver 120 to support large frequency ranges and bandwidths.

In the depicted configuration, the wireless transceiver 120 includes an amplification circuit 126. The amplification circuit 126 can amplify signals for transmission or amplify signals that are received during reception. The amplification circuit 126 includes at least one driver stage 128, at least one output stage 130, and at least one coupling circuit 132. Both the driver stage 128 and the output stage 130 include power amplifiers, which are connected together using the coupling circuit 132. In example implementations, the coupling circuit 132 includes the electromagnetic circuit 124. An example amplification circuit 126 is further described with respect to FIG. 4.

In some cases, the amplification circuit 126 is unable to provide sufficient gain across a wide range of frequencies when the switchable electromagnetic ring 122 establishes the open circuit. The wide range of frequencies can refer to a range of frequencies on the order of gigahertz (GHz), such as a range of two gigahertz. Consider an example in which the amplification circuit 126 can amplify signals with frequencies between approximately 5 and 6.5 GHz. To enable the amplification circuit 126 to also provide sufficient gain across frequencies from approximately 6.5 to 7.25 GHz, the switchable electromagnetic ring 122 establishes the closed circuit. This changes the inductance of the coupling circuit 132 and shifts a resonant frequency of the coupling circuit 132 towards the range of frequencies between 6.5 and 7.25 GHz. By shifting the resonant frequency, the switchable electromagnetic ring 122 can enable the amplification circuit 126 to also provide sufficient gain across the frequencies between 6.5 and 7.25 GHz. Performance of the amplification circuit 126 is further described with respect to FIG. 5. The switchable electromagnetic ring 122 is further described with respect to FIG. 2.

Figure 2:
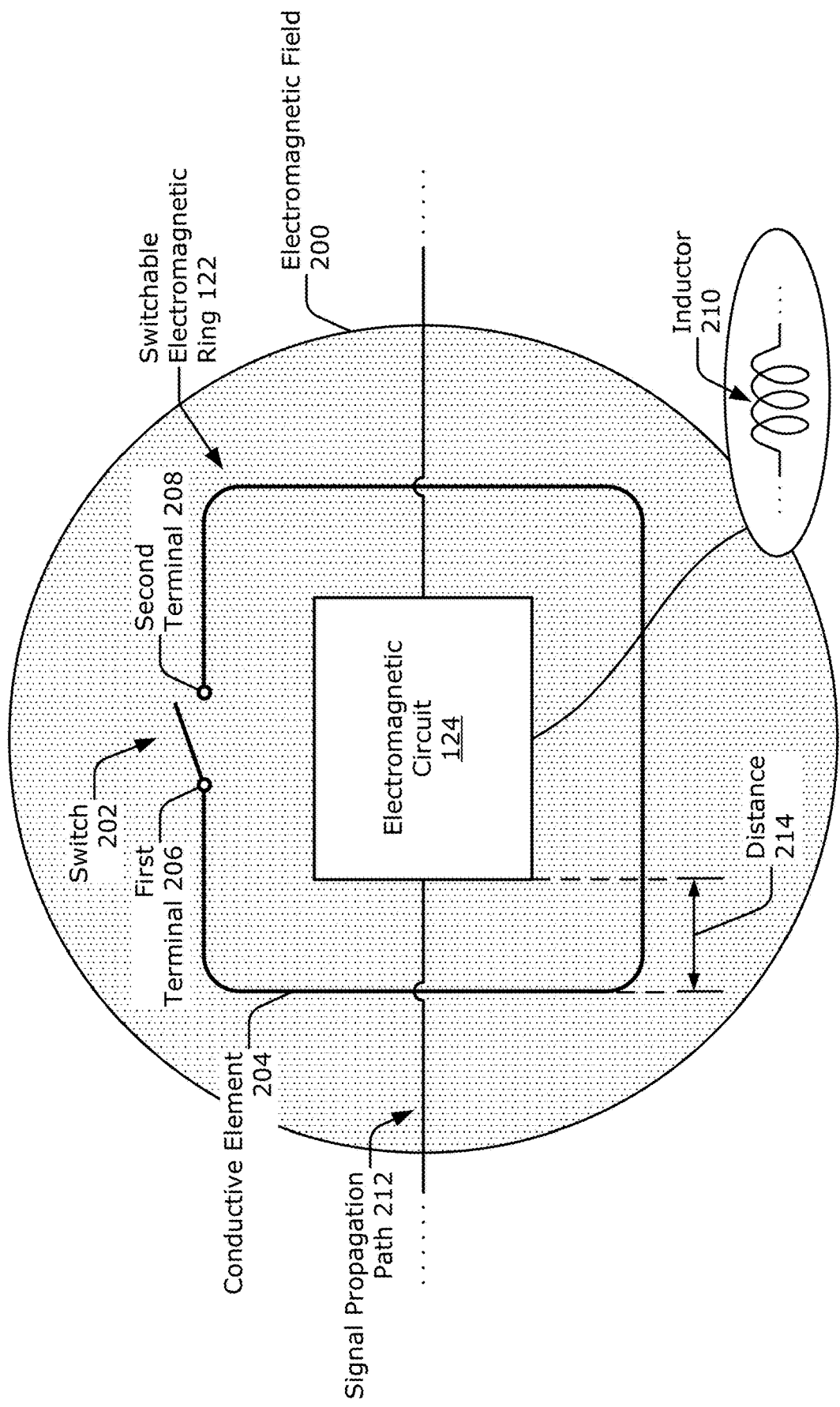
FIG. 2 illustrates an example switchable electromagnetic ring positioned within an electromagnetic field generated by an electromagnetic circuit.

FIG. 2 illustrates an example switchable electromagnetic ring 122 positioned within an electromagnetic field 200 generated by the electromagnetic circuit 124. The switchable electromagnetic ring 122 includes at least one switch 202 and at least one conductive element 204. The switch 202 can be implemented using one or more transistors; such as metal-oxide-semiconductor field-effect transistors (MOSFETs) (e.g., n-type MOSFETs or p-type MOSFETs), junction field-effect transistors (JFETs), bipolar junction transistors (BJTs), and insulated gate bipolar transistors (IGBTs); diodes; and so forth. The switch 202 can be in a closed state or an open state. The conductive element 204 is implemented using a material that can conduct an electrical current, such as metal. The conductive element 204 is connected between a first terminal 206 of the switch 202 and a second terminal 208 of the switch 202. The electromagnetic circuit 124 includes at least one inductor 210.

The switchable electromagnetic ring 122 can form a regular shape or an irregular shape using the switch 202 and the conductive element 204. Example shapes include a rectangular shape, a triangular shape, a circular shape, an elliptical shape, a figure-eight shape, or a shape with at least one curve. In some cases, the shape of the switchable electromagnetic ring 122 has multiple loops that overlap each other across a given dimension, such as a figure-eight shape that is folded on itself so that the two loops at least partially overlap.

The switchable electromagnetic ring 122 and the electromagnetic circuit 124 can be implemented on one or more layers of a printed circuit board. In some implementations, at least a portion of the switchable electromagnetic ring 122 and at least a portion of the inductor 210 are implemented on a same layer. Within this layer, the switchable electromagnetic ring 122 can fully or partially surround the inductor 210 (with the switchable electromagnetic ring 122 being shown fully surrounding the inductor 210 in FIG. 2) or be fully or partially to a side of the inductor 210. In other implementations, the switchable electromagnetic ring 122 and the inductor 210 are implemented on different layers. In this case, a portion of the switchable electromagnetic ring 122 can overlap at least a portion of the inductor 210 along a vertical dimension that is substantially perpendicular to a center axis of the inductor 210. Sometimes the switchable electromagnetic ring 122 and the inductor 210 are concentric with respect to each other and share a same center axis. Other times, the switchable electromagnetic ring 122 and the inductor 210 have different center axes, which can be substantially parallel to each other.

The electromagnetic circuit 124 is positioned along a signal propagation path 212. The switch 202 and the conductive element 204, however, are not electrically connected to the signal propagation path 212 or the electromagnetic circuit 124. Therefore, a signal that passes through the electromagnetic circuit 124 does not propagate directly through the switchable electromagnetic ring 122. This mitigates concerns regarding the reliability of the switch 202 and enables the performance requirements of the switch 202 to be relaxed. Therefore, the switch 202 can have a lower cost and smaller area relative to other switches that are within the signal propagation path 212, such as those used to implement switchable inductors.

Using the switch 202 and the conductive element 204, the switchable electromagnetic ring 122 establishes an open circuit or a closed circuit depending on the state of the switch 202. If the switch 202 is in the open state, the switchable electromagnetic ring 122 establishes an open circuit, which is substantially unable to conduct a current in response to the electromagnetic field 200. If the switch 202 is in the closed state, however, the switchable electromagnetic ring 122 establishes a closed circuit, couples to the electromagnetic circuit 124, and conducts a current in response to the electromagnetic field 200.

The amount of coupling between the electromagnetic circuit 124 and the switchable electromagnetic ring 122, and therefore the amount of current conducted within the switchable electromagnetic ring 122, is dependent upon a distance 214 between these elements (e.g., an amount of the switchable electromagnetic ring 122 that is positioned within a given magnitude of the electromagnetic field 200). The amount of coupling increases for smaller distances 214 and decreases for larger distances 214. Therefore, the distance 214 can be set to realize a particular amount of coupling between the switchable electromagnetic ring 122 and the electromagnetic circuit 124.

When the switchable electromagnetic ring 122 establishes the open circuit, the electromagnetic circuit 124 has a first inductance. When the switchable electromagnetic ring 122 establishes the closed circuit, the switchable electromagnetic ring 122 causes the electromagnetic circuit 124 to have a second inductance that is less than the first inductance. The amount that the inductance decreases is dependent on the distance 214 between the switchable electromagnetic ring 122 and the electromagnetic circuit 124. With the ability to selectively adjust an inductance of an electromagnetic circuit 124, the switchable electromagnetic ring 122 can be used in place of switchable inductors. Multiple switchable electromagnetic rings 122 can be used to adjust the inductance by additional amounts, as further described with respect to FIG. 3.

Figure 3:
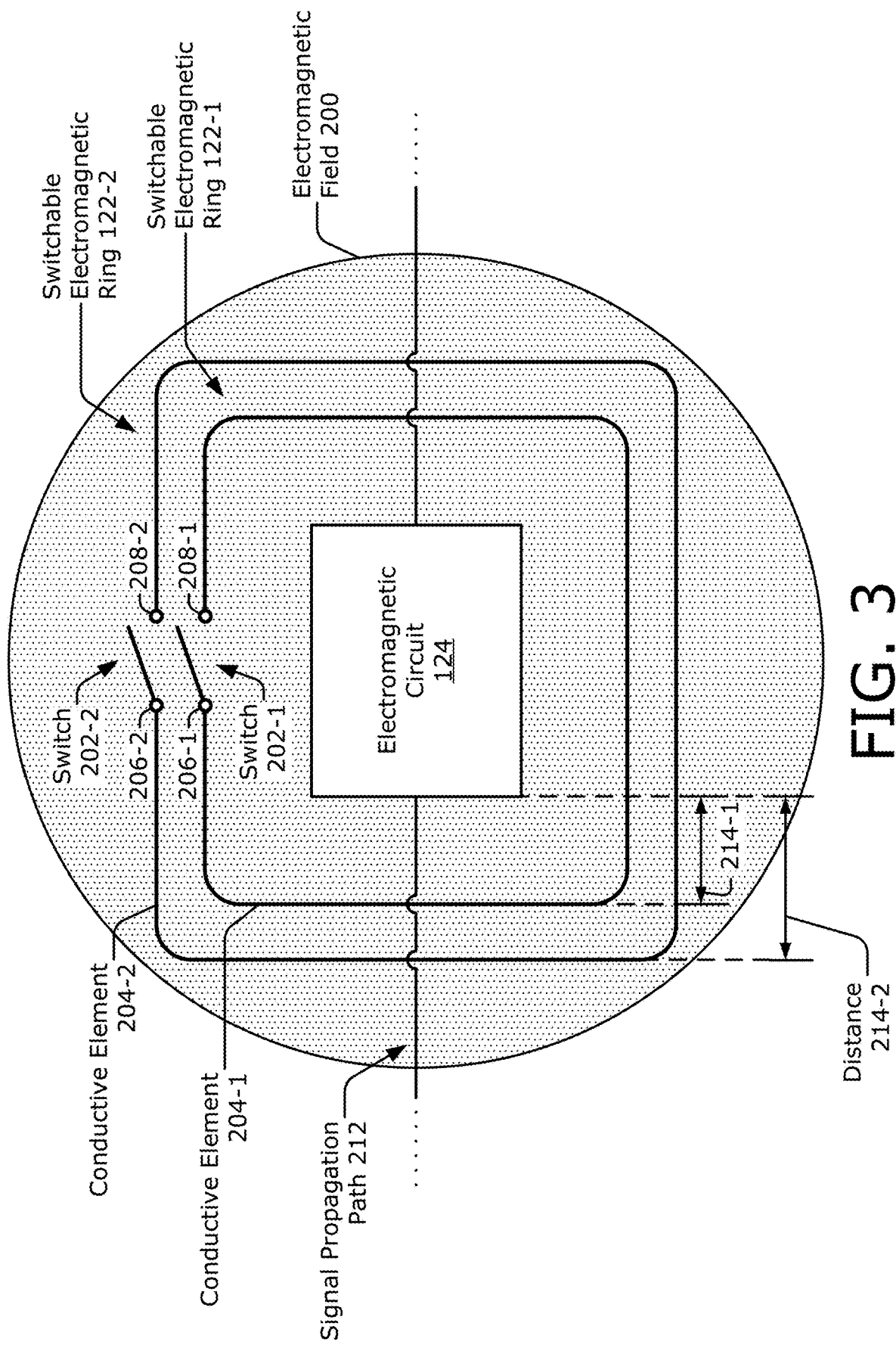
FIG. 3 illustrates example switchable electromagnetic rings positioned within an electromagnetic field generated by an electromagnetic circuit.

FIG. 3 illustrates example switchable electromagnetic rings 122-1 and 122-2 positioned within the electromagnetic field 200 generated by the electromagnetic circuit 124. The switchable electromagnetic rings 122-1 and 122-2 can be implemented on a same layer or different layers of a printed circuit board. In some cases, the switchable electromagnetic rings 122-1 and 122-2 are concentric with respect to each other. Although only two switchable electromagnetic rings 122-1 and 122-2 are shown in FIG. 3, other implementations can include more than two switchable electromagnetic rings 122.

In the depicted configuration, the first switchable electromagnetic ring 122-1 includes a switch 202-1 and a conductive element 204-1. The conductive element 204-1 is coupled between a first terminal 206-1 of the switch 202-1 and a second terminal 208-1 of the switch 202-1. Similarly, the second switchable electromagnetic ring 122-2 includes a switch 202-2 and a conductive element 204-2. The conductive element 204-2 is coupled between a first terminal 206-2 of the switch 202-2 and a second terminal 208-2 of the switch 202-1.

The first switchable electromagnetic ring 122-1 is positioned a distance 214-1 from the electromagnetic circuit 124. The second switchable electromagnetic ring 122-2 is positioned a distance 214-2 from the electromagnetic circuit 124. In FIG. 3, the distance 122-2 is larger than the distance 122-1. As such, an amount of coupling between the first switchable electromagnetic ring 122-1 and the electromagnetic circuit 124 can be larger than the amount of coupling between the second switchable electromagnetic ring 122-2 and the electromagnetic circuit 124.

The use of multiple switchable electromagnetic rings 122-1 and 122-2 enables the inductance of the electromagnetic circuit 124 to be adjusted by different amounts. In a first example, the switchable electromagnetic rings 122-1 and 122-2 each establish an open circuit. In this case, the electromagnetic circuit 124 has a first inductance. In a second example, the switchable electromagnetic ring 122-2 establishes a closed circuit, and the switchable electromagnetic ring 122-2 establishes an open circuit. This causes the electromagnetic circuit 124 to have a second inductance that is smaller than the first inductance. In a third example, the switchable electromagnetic ring 122-1 establishes a closed circuit, and the switchable electromagnetic ring 122-1 establishes an open circuit. In this case, the electromagnetic circuit 124 has a third inductance that is smaller than the second inductance because the first switchable electromagnetic ring 122-1 is closer than the second switchable electromagnetic ring 122-2. In a fourth example, both the switchable electromagnetic rings 122-1 and 122-2 establish closed circuits, which causes the electromagnetic circuit 124 to have a fourth inductance that is smaller than the third inductance. In this way, the multiple switchable electromagnetic rings 122-1 and 122-2 provide additional flexibility in adjusting the inductance of the electromagnetic circuit 124 relative to a single switchable electromagnetic ring 122.

In FIGS. 2 and 3, the switchable electromagnetic ring 122 (of FIG. 2) and the switchable electromagnetic rings 122-1 and 122-2 (of FIG. 3) are shown to surround the electromagnetic circuit 124. Although not explicitly shown, the switchable electromagnetic rings 122, 122-1, and 122-2 can form shapes that at least substantially surround the electromagnetic circuit 124. For example, lead lines that connect an inductor of the electromagnetic circuit 124 to the signal propagation path 212 may be partially within or partially outside of these shapes. In this case, the term substantially can refer to each of the shapes surrounding more than 50% of the electromagnetic circuit 124, such as approximately 70%, 80%, or 90% of the electromagnetic circuit 124.

In another implementation not explicitly shown in FIGS. 2 and 3, the switchable electromagnetic ring 122, 122-1, or 122-2 can be next to one side of the electromagnetic circuit 124 instead of above, below, or surrounding all sides of the electromagnetic circuit 124. In other words, the shapes formed by the switchable electromagnetic rings 122, 122-1, and 122-2 do not overlap the inductor 210 along a vertical dimension that is substantially parallel to a center axis of the inductor 210.

In FIGS. 2 and 3, the switchable electromagnetic ring 122 (of FIG. 2) and the switchable electromagnetic rings 122-1 and 122-2 (of FIG. 3) are shown to be entirely positioned within the electromagnetic field 200, or some relevant magnitude thereof. In other implementations, portions (but not an entirety) of the switchable electromagnetic rings 122, 122-1, and 122-2 are positioned within the electromagnetic field 200. These portions can represent a particular percentage of the switchable electromagnetic rings 122, 122-1, and 122-2, such as 10%, 25%, 50%, 75%, 90%, or any percentage that is greater than 0%. In general, this percentage is sufficient to cause respective currents to flow through the switchable electromagnetic rings 122, 122-1, and 122-2 responsive to the switchable electromagnetic rings 122, 122-1, and 122-2 establishing respective closed circuits. In some cases, the switchable electromagnetic rings 122-1 and 122-2 have different percentages that are positioned within the electromagnetic field 200. The percentage of the switchable electromagnetic rings 122, 122-1, and 122-2 that are positioned within the electromagnetic field 200 determines an amount by which the switchable electromagnetic rings 122, 122-1, and 122-2 can adjust the inductance of the electromagnetic circuit 124.

Figure 4:
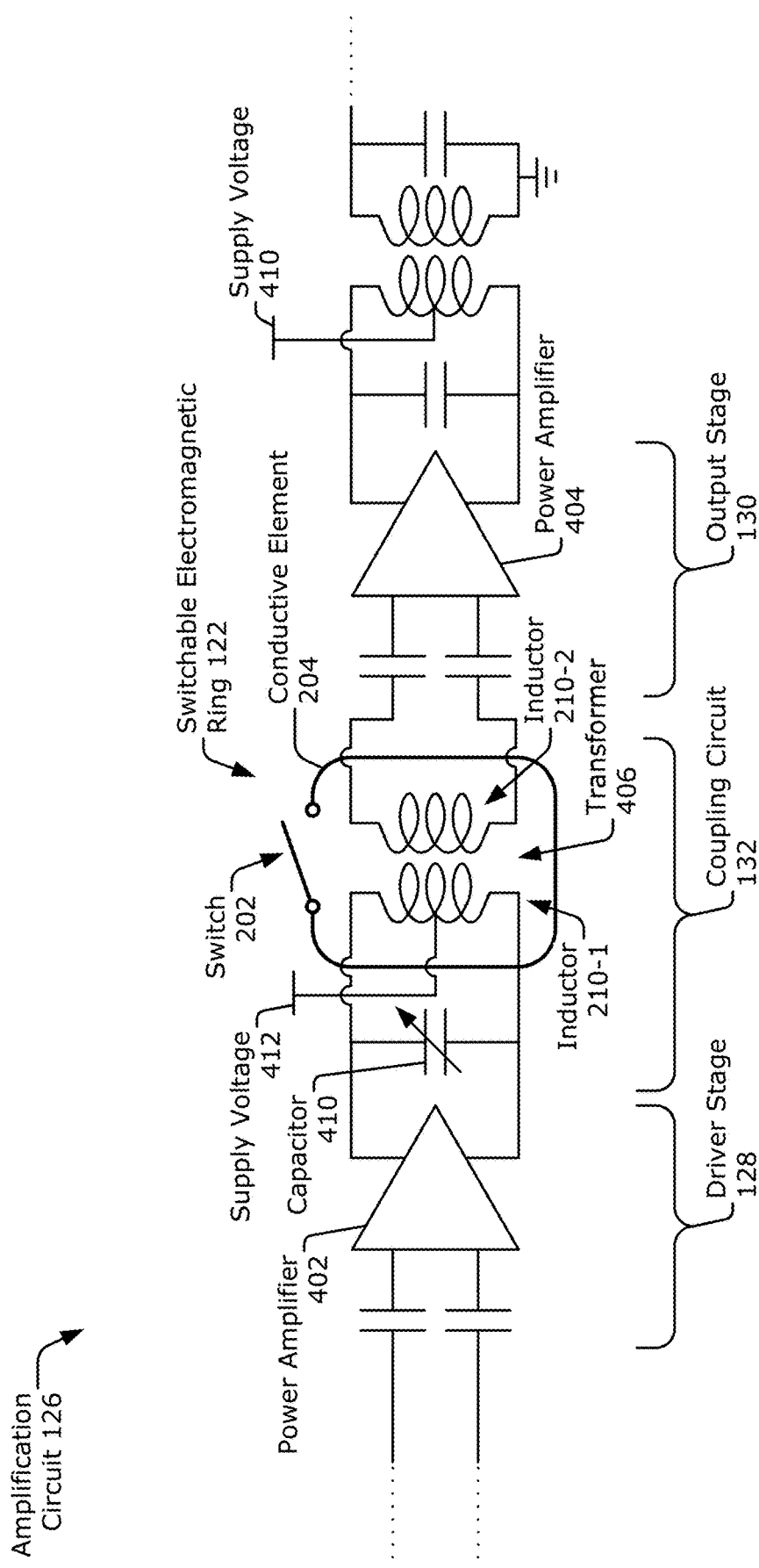
FIG. 4 illustrates an example amplification circuit and a switchable electromagnetic ring.

FIG. 4 illustrates an example amplification circuit 126 and the switchable electromagnetic ring 122. As described above with respect to FIG. 1, the amplification circuit 126 includes the driver stage 128, the output stage 130, and the coupling circuit 132. The driver stage includes a power amplifier 402, and the output stage 130 includes a power amplifier 404. The coupling circuit 132 includes a transformer 406. The transformer 406 includes two inductors 210-1 and 210-2. The inductors 210-1 and 210-2 can be implemented on a same layer of a printed circuit board or on different layers. In some implementations, the inductors 210-1 and 210-2 are concentric. In other implementations, the inductors 210-1 and 210-2 are implemented side-by-side or stacked on top of each other. In other implementations, the coupling circuit 132 can include a differential inductor instead of the transformer 406.

The coupling circuit 132 can also include at least one capacitor 410, which can be implemented as a variable capacitor. In the depicted configuration, the capacitor 410 is connected in parallel to the first inductor 210-1. The inductor 210-1 is also connected to a supply voltage 412. Together, the capacitor 410 and the inductor 210-1 establish a parallel LC circuit. Adjusting an inductance of the inductor 210-1 and/or a capacitance of the capacitor 410 adjusts a resonant frequency of the coupling circuit 132.

In FIG. 4, at least a portion of the switchable electromagnetic ring 122 is positioned within the electromagnetic field 200 (of FIG. 2), which is generated by the transformer 406. In the depicted configuration, the switchable electromagnetic ring 122 substantially surrounds the transformer 406. By controlling a state of the switch 202, the switchable electromagnetic ring 122 can adjust the inductance provided by the transformer 406 (e.g., provided by the inductor 210-1), as described above with respect to FIG. 2. In this way, the switchable electromagnetic ring 122 can adjust a gain of the amplification circuit 126 and enable the amplification circuit 126 to provide sufficient amplification for a large range of frequencies. The performance of the amplification circuit 126 is further described with respect to FIG. 5.

Figure 5:
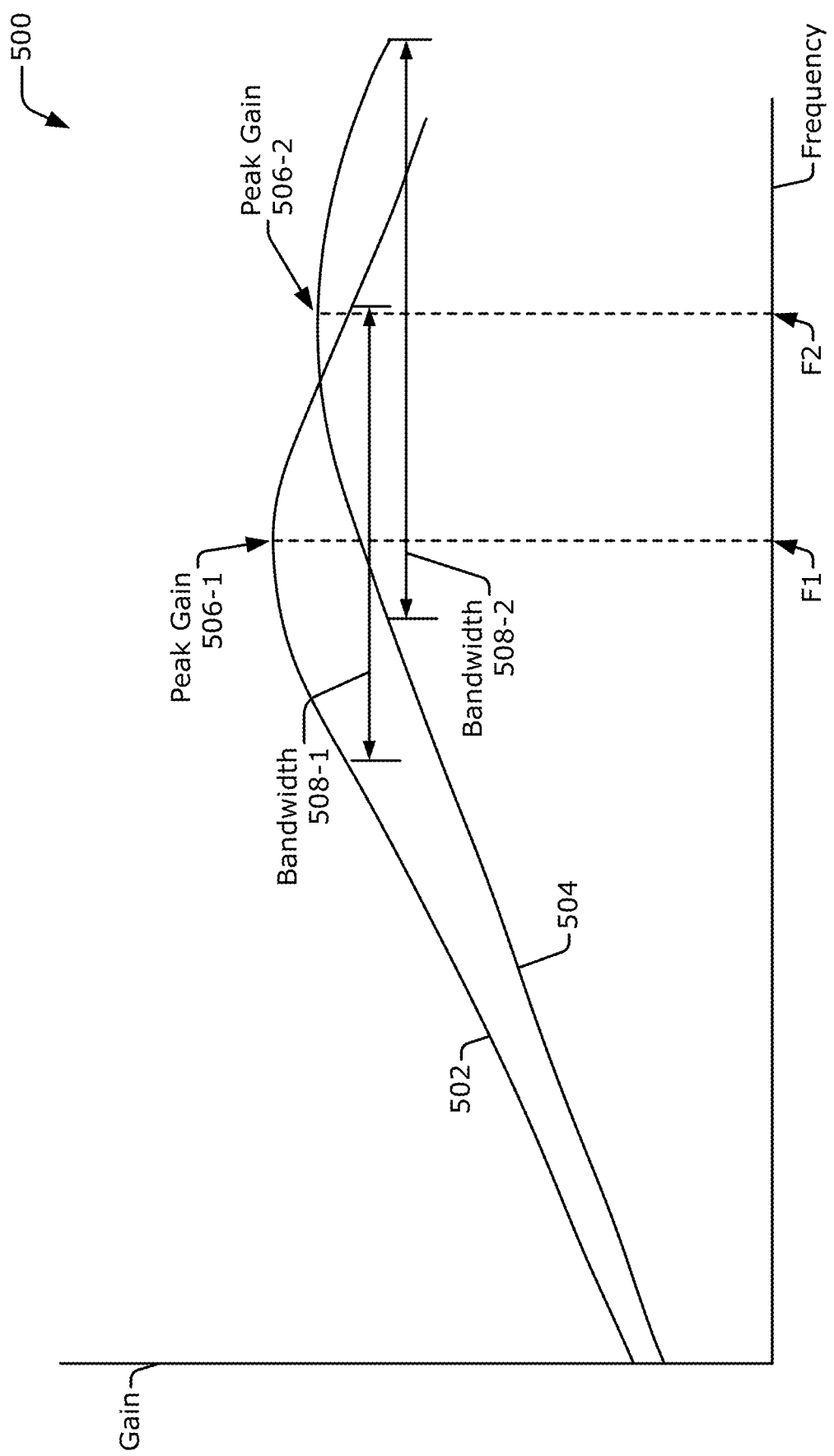
FIG. 5 illustrates example gains of an amplification circuit based on different states of a switchable electromagnetic ring.

FIG. 5 illustrates example gains of the amplification circuit 126 based on different states of the switchable electromagnetic ring 122. Graph 500 illustrates example gains of the amplification circuit 126 over a range of frequencies, such as across 5 and 7.3 GHz. In this example, the amplification circuit 126 has a first gain illustrated by 502, which occurs responsive to the switchable electromagnetic ring 122 establishing the open circuit. In this case, the amplification circuit 126 has a peak gain 506-1 at frequency F1 and a bandwidth 508-1.

Alternatively, the amplification circuit 126 has a second gain illustrated by 504 responsive to the switchable electromagnetic ring 122 establishing the closed circuit. In this case, the amplification circuit 126 has a peak gain 506-2 at frequency F2 and a bandwidth 508-2. The frequency F2 is higher than the frequency F1, and the bandwidth 508-2 is wider than the bandwidth 508-1. The gain across 504 also has less variation across the bandwidth 508-2 relative to the gain across 502. By changing a state of the switch 202 of FIG. 4, the gain of the amplification circuit 126 can switch between 502 and 504 based on a frequency and bandwidth of a transmitted or received signal.

Figure 6:
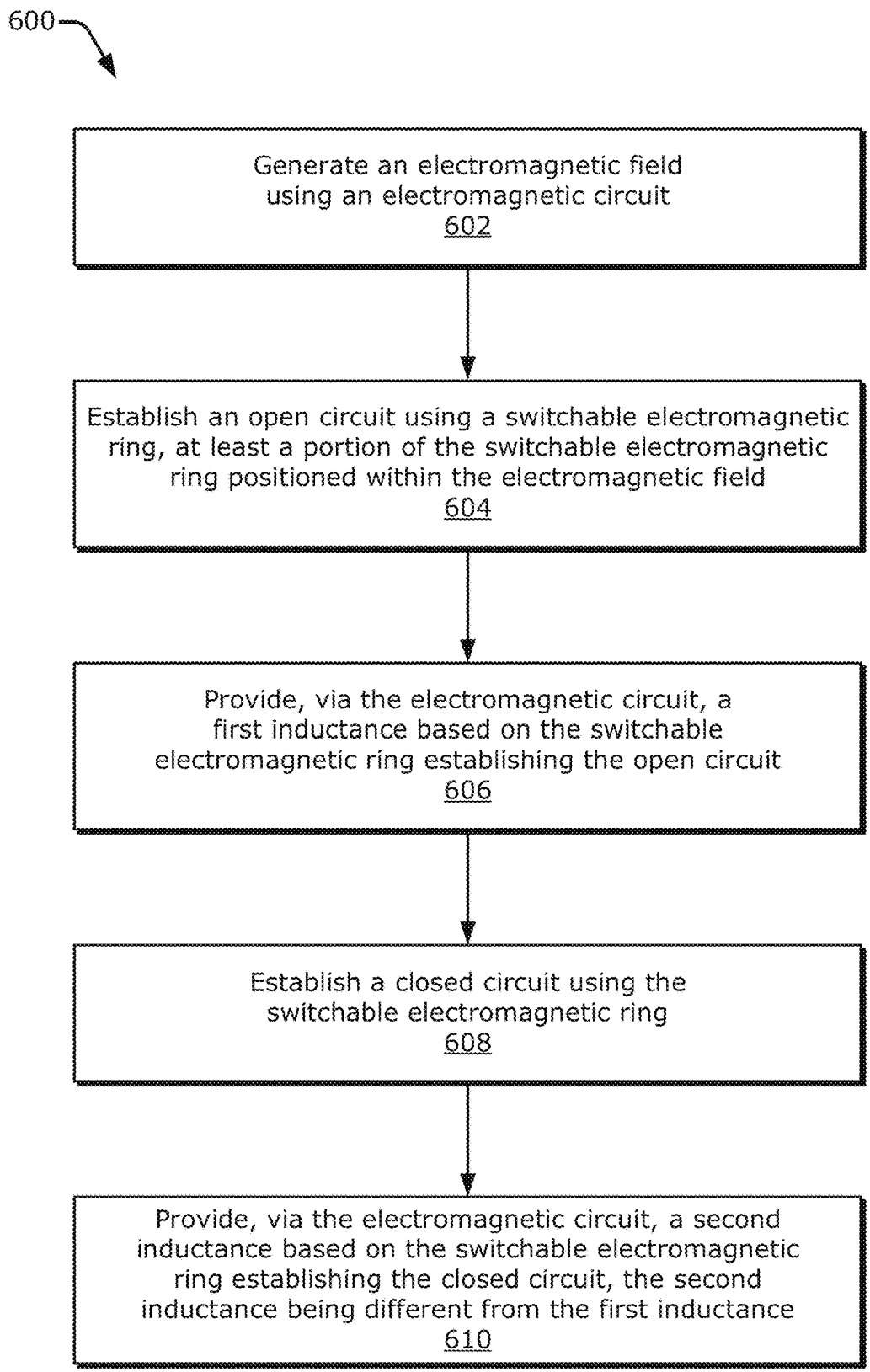
FIG. 6 is a flow diagram illustrating an example process for adjusting an inductance of an electromagnetic circuit using a switchable electromagnetic ring.

FIG. 6 is a flow diagram illustrating an example process 600 for adjusting an inductance of an electromagnetic circuit using a switchable electromagnetic ring. The process 600 is described in the form of a set of blocks 602-610 that specify operations that can be performed. However, operations are not necessarily limited to the order shown in FIG. 6 or described herein, for the operations may be implemented in alternative orders or in fully or partially overlapping manners. Also, more, fewer, and/or different operations may be implemented to perform the process 600, or an alternative process. Operations represented by the illustrated blocks of the process 600 may be performed by a wireless transceiver 120 (e.g., of FIG. 1). More specifically, the operations of the process 600 may be performed, at least in part, by a switchable electromagnetic ring 122 and an electromagnetic circuit 124 (e.g., of FIG. 2).

At block 602, an electromagnetic field is generated using an electromagnetic circuit. For example, the electromagnetic circuit 124 generates the electromagnetic field 200, as shown in FIG. 2. The electromagnetic circuit 124 can include at least one inductor 210.

At block 604, an open circuit is established using a switchable electromagnetic ring. At least a portion of the switchable electromagnetic ring is positioned within the electromagnetic field. For example, the switchable electromagnetic ring 122 establishes the open circuit based on the switch 202 being in the open state, as shown in FIG. 2. At least a portion of the switchable electromagnetic ring 122 is positioned within the electromagnetic field 200. This portion can include 10%, 50%, or 90% of the switchable electromagnetic ring 122, for instance. In some implementations, at least a portion of the switchable electromagnetic ring 122 substantially surrounds the electromagnetic circuit 124.

At block 606, a first inductance is provided via the electromagnetic circuit. The first inductance is based on the switchable electromagnetic ring establishing the open circuit. For example, the electromagnetic circuit 124 provides the first inductance based on the switchable electromagnetic ring 122 establishing the open circuit. Because the switchable electromagnetic ring 122 establishes the open circuit, the switchable electromagnetic ring 122 does not couple to the electromagnetic circuit 124 and does not conduct a current. As such, the first inductance is relatively unaffected by the presence of the switchable electromagnetic ring 122.

At block 608, a closed circuit is established using the switchable electromagnetic ring. For example, the switchable electromagnetic ring 122 establishes the closed circuit. To establish the closed circuit, the switch 202 can be in the closed state.

At block 610, a second inductance is provided via the electromagnetic circuit. The second inductance is based on the switchable electromagnetic ring establishing the closed circuit and is different from the first inductance. For example, the electromagnetic circuit 124 provides the second inductance based on the switchable electromagnetic ring 122 establishing the closed circuit. Due to the closed circuit, the switchable electromagnetic ring 122 couples to the electromagnetic circuit 124 and conducts a current. This reduces the inductance provided by the electromagnetic circuit 124. As such, the second inductance can be less than the first inductance. In some cases, multiple switchable electromagnetic rings 122 can be used to adjust the inductance of the electromagnetic circuit 124 by additional amounts.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An amplification circuit for amplifying radio frequency signals in a wireless transceiver, the amplification circuit comprising:
a transformer including an electromagnetic circuit configured to generate an electromagnetic field; and
at least one switchable electromagnetic ring at least partially surrounding the transformer, the at least one switchable electromagnetic ring comprising:
a switch having a first terminal and a second terminal; and
a conductive element connected between the first terminal and the second terminal, at least a portion of the conductive element positioned within the electromagnetic field.

2. The amplification circuit of claim 1, wherein the conductive element and the switch form a shape that at least substantially surrounds the electromagnetic circuit.

3. The amplification circuit of claim 1, wherein:
the electromagnetic circuit includes at least one inductor, the at least one inductor comprising one or more coils that are formed around a center axis; and
the at least one switchable electromagnetic ring is positioned to a side of the at least one inductor such that a shape formed by the switch and the conductive element does not overlap the at least one inductor along a vertical dimension that is substantially parallel to the center axis.

4. The amplification circuit of claim 1, wherein:
the switch is configured to selectively be in an open state or a closed state; and
the at least one switchable electromagnetic ring is configured to selectively:
establish an open circuit responsive to the switch being in the open state; and
establish a closed circuit responsive to the switch being in the closed state.

5. The amplification circuit of claim 4, wherein the at least one switchable electromagnetic ring is configured to couple to the electromagnetic circuit via the electromagnetic field responsive to the at least one switchable electromagnetic ring establishing the closed circuit.

6. The amplification circuit of claim 4, wherein the electromagnetic circuit is configured to provide:
a first inductance responsive to the at least one switchable electromagnetic ring establishing the open circuit; and
a second inductance responsive to the at least one switchable electromagnetic ring establishing the closed circuit, the first inductance being larger than the second inductance.

7. The amplification circuit claim 6, wherein a difference between the first inductance and the second inductance is based on a distance between the electromagnetic circuit and the at least one switchable electromagnetic ring.

8. The amplification circuit of claim 6, further comprising:
a driver stage;
an output stage; and
a coupling circuit comprising the the transformer, the coupling circuit configured to couple the driver stage to the output stage using the electromagnetic field.

9. The amplification circuit claim 8, wherein:
the transformer comprises an inductor;
the coupling circuit comprises a capacitor, the capacitor coupled in parallel with the inductor;
the driver stage comprises a first power amplifier; and
the output stage comprises a second power amplifier.

10. The amplification circuit of claim 8, wherein the amplification circuit is configured to:
provide a first peak gain at a first frequency responsive to the electromagnetic circuit providing the first inductance; and
provide a second peak gain at a second frequency responsive to the electromagnetic circuit providing the second inductance, the second frequency being higher than the first frequency.

11. The amplification circuit of claim 8, wherein the amplification circuit is configured to:
have a first bandwidth responsive to the electromagnetic circuit providing the first inductance; and
have a second bandwidth responsive to the electromagnetic circuit providing the second inductance, the second bandwidth being wider than the first bandwidth.

12. The amplification circuit of claim 8, wherein the amplification circuit is configured to operate at frequencies between approximately 5 and 7.25 gigahertz.

13. The amplification circuit of claim 8, further comprising:
a display screen; and
a processor operatively coupled to the display screen and the wireless transceiver, wherein:
the wireless transceiver is configured to condition signals for transmission or reception using the amplification circuit; and
the processor is configured to present one or more graphical images on the display screen based on the signals conditioned by the wireless transceiver.

14. The amplification circuit of claim 1, wherein:
the at least one switchable electromagnetic ring comprises a first switchable electromagnetic ring and a second switchable electromagnetic ring;
the first switchable electromagnetic ring comprises the conductive element and the switch; and
the second switchable electromagnetic ring comprises another conductive element and another switch.

15. The amplification circuit of claim 14, wherein the electromagnetic circuit is configured to selectively have:
a first inductance responsive to the switch of the first switchable electromagnetic ring being in an open state and the other switch of the second switchable electromagnetic ring being in the open state;
a second inductance responsive to the switch of the first switchable electromagnetic ring being in a closed state and the other switch of the second switchable electromagnetic ring being in the open state;
a third inductance responsive to the switch of the first switchable electromagnetic ring being in the open state and the other switch of the second switchable electromagnetic ring being in the closed state; and
a fourth inductance responsive to the switch of the first switchable electromagnetic ring being in the closed state and the other switch of the second switchable electromagnetic ring being in the closed state,
the first inductance being larger than the third inductance, the third inductance being larger than the second inductance, and the second inductance being larger than the fourth inductance.

16. A method comprising:
generating an electromagnetic field using an electromagnetic circuit;
establishing an open circuit using a switchable electromagnetic ring, at least a portion of the switchable electromagnetic ring positioned within the electromagnetic field;
providing, via the electromagnetic circuit, a first inductance based on the switchable electromagnetic ring establishing the open circuit;
establishing a closed circuit using the switchable electromagnetic ring;
providing, via the electromagnetic circuit, a second inductance based on the switchable electromagnetic ring establishing the closed circuit, the second inductance being different from the first inductance; and
providing, via an amplification circuit that includes the electromagnetic circuit, a first peak gain at a first frequency responsive to the electromagnetic circuit providing the first inductance; and
providing, via the amplification circuit, a second peak gain at a second frequency responsive to the electromagnetic circuit providing the second inductance, the second frequency being higher than the first frequency, the second inductance being less than the first inductance.

17. The method of claim 16, further comprising:
generating a current through the switchable electromagnetic ring responsive to the switchable electromagnetic ring establishing the closed circuit, the current based on the electromagnetic field.

* * * * *